(12) United States Patent
Chiu et al.

(10) Patent No.: US 11,391,925 B2
(45) Date of Patent: Jul. 19, 2022

(54) OPTICAL LENS

(71) Applicant: Young Optics Inc., Hsinchu (TW)

(72) Inventors: Wei-Ting Chiu, Hsinchu (TW); Chien-Hsiung Tseng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 149 days.

(21) Appl. No.: 16/858,702

(22) Filed: Apr. 26, 2020

(65) Prior Publication Data

US 2021/0333509 A1 Oct. 28, 2021

(51) Int. Cl.
*G02B 13/00* (2006.01)
*G02B 9/10* (2006.01)
*G02B 9/62* (2006.01)
*G02B 9/64* (2006.01)

(52) U.S. Cl.
CPC ........... *G02B 13/0045* (2013.01); *G02B 9/10* (2013.01); *G02B 9/62* (2013.01); *G02B 13/006* (2013.01); *G02B 9/64* (2013.01)

(58) Field of Classification Search
CPC ........ G02B 13/0045; G02B 9/10; G02B 9/62; G02B 13/006; G02B 9/64
See application file for complete search history.

(56) References Cited

U.S. PATENT DOCUMENTS

| | | | |
|---|---|---|---|
| 10,215,962 B2 | 2/2019 | Liu et al. | |
| 2017/0307851 A1* | 10/2017 | Chen | .................. G02B 9/62 |
| 2018/0120544 A1* | 5/2018 | Chiang | .................. G02B 9/62 |
| 2019/0094498 A1* | 3/2019 | Liao | .................. G02B 13/06 |
| 2019/0310442 A1 | 10/2019 | Ikeo et al. | |
| 2019/0384038 A1* | 12/2019 | Liao | .................. G02B 13/0045 |

FOREIGN PATENT DOCUMENTS

JP 2017167253 A * 9/2017
TW I647508 1/2019

* cited by examiner

*Primary Examiner* — George G. King
(74) *Attorney, Agent, or Firm* — JCIPRNET

(57) ABSTRACT

An optical lens includes a first lens group, an aperture, and a second lens group which are sequentially arranged along an optical axis from a magnified side to a minified side. The first lens group has a negative refractive power and includes three lenses with refractive powers. The first lens group includes a lens with positive refractive power. The first lens group includes an aspheric lens. The second lens group has a positive refractive power and includes three lenses with refractive power. The second lens group includes a lens with a negative refractive power. The second lens group includes a lens closest to the minified side which is a cemented lens. The second lens group includes an aspheric lens. In the optical lens, a number of the lenses having the refractive powers is within a range from 6 to 8.

14 Claims, 6 Drawing Sheets

OPTICAL LENS

BACKGROUND OF THE INVENTION

Field of the Invention

The invention relates to an optical lens, and more particularly, to an imaging lens.

Description of Related Art

Due to limitation to shape and materials of lenses of a conventional wide-angle optical lens, the volume of the optical lens cannot be easily reduced, and it is difficult to take the imaging quality into consideration, given a large aperture and a wide viewing angle. Therefore, researchers in the pertinent field should be dedicated to how to satisfy requirements for wide viewing angle, high imaging quality, tolerance of environmental variations, miniaturization, and small thermal drift at the same time.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical lens, whereby the number of lenses and costs may be effectively reduced, the aberration issue may be better resolved, and good optical effects may be achieved.

Other advantages can be further illustrated by the technical features broadly embodied and described as follows.

In order to achieve one or a portion of or all of the objectives or other objectives, an embodiment of the invention provides an optical lens, and the optical lens includes a first lens group, an aperture, and a second lens group sequentially arranged along an optical axis from a magnified side to a minified side. The first lens group has a negative refractive power and includes three lenses with refractive powers. The first lens group includes a lens with a positive refractive power and an aspheric lens. The second lens group has a positive refractive power and includes three lenses with refractive powers. The second lens group includes a lens with a negative refractive power, a lens of the second lens group closest to the minified side is a cemented lens, and the second lens group includes an aspheric lens. In the optical lens, a number of the lenses having the refractive powers is within a range from 6 to 8. The optical lens satisfies $9<LT/EFL<15$ and $LT/D1<12$, wherein LT is a distance along the optical axis from a surface of a lens of the first lens group closest to the magnified side to a surface of a lens of the second lens group farthest from the first lens group, EFL is an effective focal length of the optical lens, and D1 is a thickness of the lens of the first lens group closest to the magnified side along the optical axis.

To achieve one, part, or all of the foregoing purposes or other purposes, an embodiment of the invention further provides an optical lens, and the optical lens includes a first lens, a second lens, a third lens, an aperture, a fourth lens, a fifth lens, and a sixth lens which are sequentially arranged from a magnified side to a minified side along an optical axis. Here, the fifth lens and the sixth lens are cemented lenses. The optical lens satisfies $9<LT/EFL<15$, $4<D6/D5<10$, $180<FOV<230$, and $80>A2>50$, wherein LT is a distance along the optical axis from a surface of a lens of the first lens group closest to the magnified side to a surface of a lens of the second lens group farthest from the first lens group, EFL is an effective focal length of the optical lens, D5 is a thickness of the fifth lens along the optical axis, D6 is a thickness of the sixth lens along the optical axis, FOV is a field of view of the optical lens, and A2 is an angle between an extension line of a concave edge of the second lens and a line perpendicular to the optical axis.

In view of the foregoing, in the optical as provided in one or more embodiments of the invention, the aspherical lenses are configured to improve the resolution, and the negative refractive power lens is configured to achieve wide-angle light collection, whereby the number of lenses and costs may be effectively reduced, the aberration issue may be better resolved, and good optical effects may be achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention.

Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
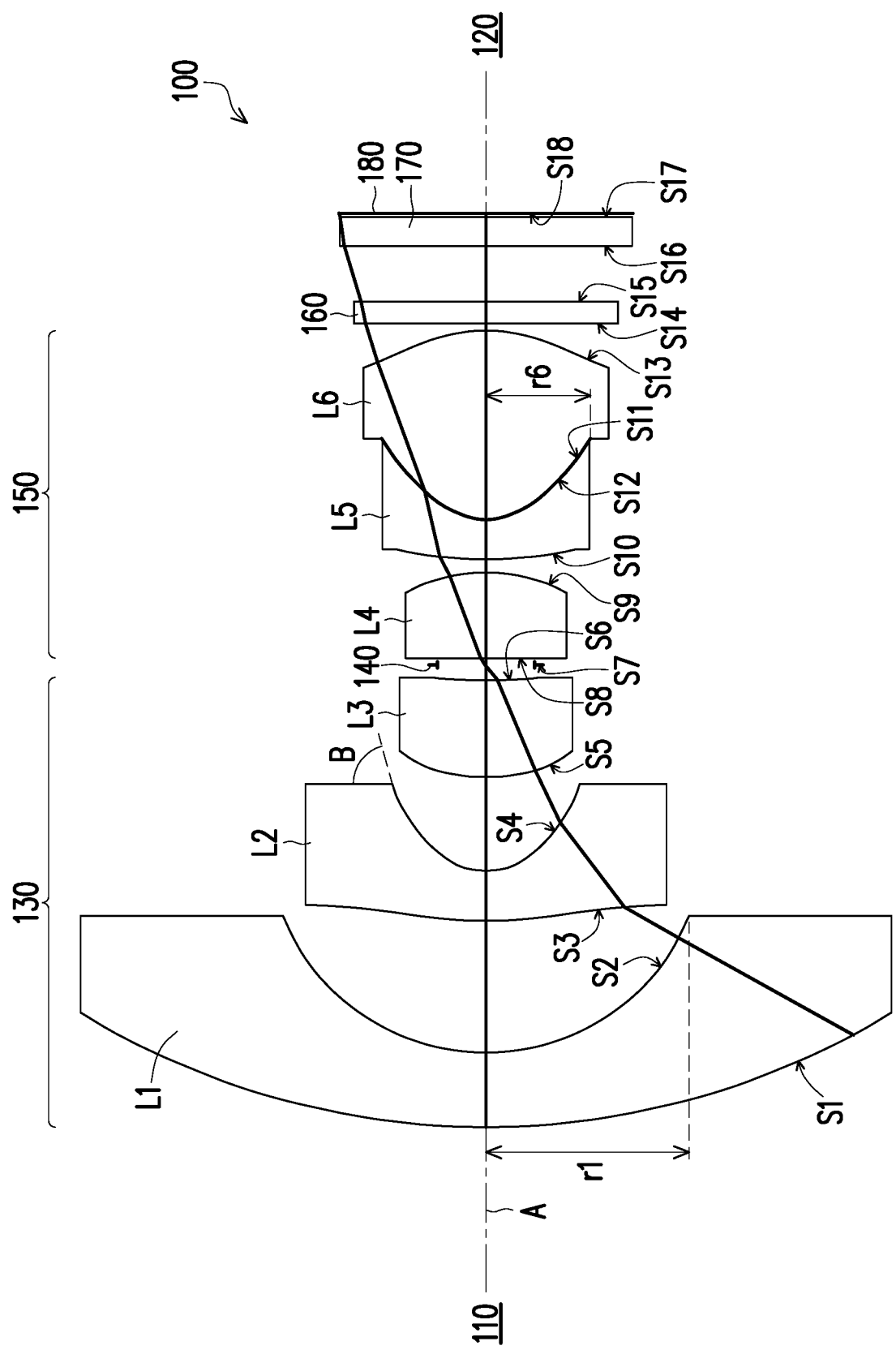
FIG. 1 is a schematic diagram of an optical lens according to an embodiment of the invention.

FIG. 1 is a schematic diagram of an optical lens according to an embodiment of the invention. With reference to FIG. 1, the embodiment provides an optical lens 100, which is an imaging lens adapted to security monitor, in-vehicle or mobile photography, and so on, which should however not be construed as a limitation to the invention. Specifically, the optical lens 100 is, for instance, a fisheye lens composed of a plurality of aspheric lenses to improve the resolution, and the optical lens 100 achieves wide-angle light collection through lenses with negative refractive powers.

The optical lens 100 has an optical axis A and includes a first lens group 130, an aperture 140, and a second lens group 150 which are sequentially arranged from a magnified side 110 to a minified side 120, wherein the magnified side 110 is a side of the optical lens 100 where a light beam enters the optical lens 100, and the minified side 120 is a side of the optical lens 100 where a light beam emits from the optical lens 100. In the embodiment, the optical lens 100 further includes an infrared filter 160 and a light-transmitting protective cover 170, and the light beam entering the optical lens 100 may be transmitted toward the minified side 120 from the magnified side 110 and imaged onto an imaging surface 180.

The first lens group 130 has a negative refractive power and includes at least one aspheric lens. The first lens group 130 includes a first lens L1, a second lens L2, and a third lens L3 sequentially arranged from the magnified side 110 to the minified side 120.

The second lens group 150 has a positive refractive power and includes at least one aspheric lens. In the embodiment, the second lens group 150 includes a fourth lens L4, a fifth lens L5, and a sixth lens L6 sequentially arranged from the magnified side 110 to the minified side 120. A refractive power of one of the fifth lens L5 and the sixth lens L6 is positive, and the other is negative. In the embodiment, the refractive power of the fifth lens L5 is negative, and the refractive power of the sixth lens L6 is positive. However, in an embodiment, the refractive power of the fifth lens L5 may be positive, and the refractive power of the sixth lens L6 may be negative, which should not be construed as a limitation to the invention. In the embodiment, at least two lenses (i.e., the fifth lens L5 and the sixth lens L6) of the second lens group 150 closest to the minified side 120 are cemented lenses.

Specifically, in the embodiment, the number of the lenses of the optical lens 100 is 6, the number of the aspheric lenses is 4, and the number of the cemented lens is 1, and thus the number of the lenses may be effectively reduced, and the issue of aberrations may be better resolved. Besides, in the embodiment, the refractive powers of the 6 lenses in the optical lens 100 are sequentially negative, negative, positive, positive, negative, and positive from the magnified side 110 to the minified side 120, and the materials are glass, plastic, plastic, glass, plastic, and plastic. In other words, the materials of the second lens L2, the third lens L3, the fifth lens L5, and the sixth lens L6 are plastic. Therefore, the costs may be effectively reduced, but the invention is not limited thereto.

The number of the lenses having the refractive powers in the optical lens 100 provided in the embodiment is within a range from 6 to 8, so as to achieve the best and better cost effectiveness. Besides, the optical lens 100 provided in the embodiment satisfies 9<LT/EFL<15, wherein LT is a distance along the optical axis A from a surface of a lens of the optical lens 100 closest to the magnified side 110 (i.e., a surface S1 of the first lens L1) to a surface of a lens of the optical lens 100 closest to the minified side 120 (i.e., a surface S13 of the sixth lens L6), and EFL is an effective focal length of the optical lens 100. In the embodiment, the optical lens 100 satisfies LT/D1<12, wherein D1 is a thickness of the lens of the optical lens 100 closest to the magnified side 110 (i.e., the first lens L1) along the optical axis A. It is worth mentioning that the refractive power of the third lens L3 is positive, and the surface S6 (the image side of the third lens L3) is concave.

On the other hand, in the embodiment, the optical lens 100 satisfies 4<Z1/Z2<10, wherein Z1 is the larger one of the thickness of the fifth lens L5 and the thickness of the sixth lens L6 along the optical axis A, and Z2 the smaller one of the thickness of the fifth lens L5 and the thickness of the sixth lens L6 along the optical axis A.

In addition, the optical lens 100 provided in the embodiment satisfies 180°<FOV<230°, wherein FOV is a maximum field of view of the optical lens 100. In a preferred embodiment, the optical lens 100 satisfies FOV>210°. In the embodiment, the lens closest to the magnified side 110 (i.e., the first lens L1) has a thickness greater than or equal to 1 mm along the optical axis A. The optical lens 100 provided in the embodiment satisfies 0.7<R1/LT<2, wherein R1 is an effective radius r1 of the lens of the optical lens 100 closest to the magnified side 110 (i.e., the first lens L1). The optical lens 100 provided in the embodiment satisfies 0.2<RL/LT<0.38, wherein RL is an effective radius r6 of the lens of the optical lens 100 closest to the minified side 120 (i.e., the sixth lens L6). The optical lens 100 provided in the embodiment satisfies D6/D5>2, wherein D6 is the thickness of the sixth lens L6 along the optical axis A, and D5 is the thickness of the fifth lens L5 along the optical axis A. The optical lens 100 provided in the embodiment satisfies 50<A2<80, wherein A2 is an angle B (also referred to as an aperture angle) between a tangent line of a concave edge of the second lens L2 and a direction perpendicular to the optical axis A, as illustrated in FIG. 1.

Therefore, in this embodiment, the optical lens 100 is a prime imaging lens, the aperture of the optical lens 100 may reach F/2.0, the total length may be within 12.5 mm, and a half field of view may reach 105° or more. Specifically, the optical lens 100 provided in the embodiment is a fisheye lens, whereby the number of lenses and costs may be effectively reduced, the aberration issue may be better resolved, and good optical effects may be achieved.

In this embodiment, the actual design of the aforesaid elements may be found in Table 1 below.

TABLE 1

EFL (mm) = 0.9011; F/# = 2; FOV (°) = 218; TTL (mm) = 12.33;
IMH (mm) = 4.01; RL (mm) = 3.283; LT (mm) = 10.736;
RL/LT = 0.306; EFL/LT = 0.0839;

| Elements | Surface | Curvature radius (mm) | Interval (mm) | Refractive index (Nd) | Abbe number (Vd) |
|---|---|---|---|---|---|
| First lens L1 | S1 | 10.465 | 1.000 | 1.804 | 46.5 |
|  | S2 | 2.931 | 1.778 |  |  |
| Second lens L2 | S3 * | 6.101 | 0.666 | 1.536 | 56.0 |
|  | S4 * | 0.844 | 1.268 |  |  |
| Third lens L3 | S5 * | 2.478 | 1.309 | 1.640 | 23.5 |
|  | S6 * | 12.703 | 0.200 |  |  |
| Aperture 140 | S7 | Infinite | 0.100 |  |  |
| Fourth lens L4 | S8 | −113.600 | 1.151 | 1.804 | 46.5 |
|  | S9 | −2.332 | 0.183 |  |  |
| Fifth lens L5 | S10 * | 4.881 | 0.528 | 1.640 | 23.5 |
|  | S11 * | 0.802 | 0.008 |  |  |
| Sixth lens L6 | S12 * | 0.802 | 2.540 | 1.536 | 56.0 |
|  | S13 * | −1.913 | 0.100 |  |  |
| Infrared filter 160 | S14 | Infinite | 0.300 | 1.517 | 64.2 |
|  | S15 | Infinite | 0.749 |  |  |
| Protective cover 170 | S16 | Infinite | 0.400 | 1.517 | 64.2 |
|  | S17 | Infinite | 0.045 |  |  |
| Imaging surface 180 | S18 | Infinite | 0.000 |  |  |

Please refer to FIG. 1 and Table 1. Specifically, in the optical lens 100 provided in the embodiment, the first lens L1 has the surface S1 and the surface S2 sequentially from the magnified side 110 to the minified side 120, the second lens L2 has the surface S3 and the surface S4 sequentially from the magnified side 110 to the minified side 120, and the surface S3 and the surface S4 are aspherical surfaces. The aspherical surfaces are represented by the symbol * in Table 1, and the corresponding surfaces of the components will not be further described hereinafter. In addition, TTL is the total length of the optical lens 100, i.e., the distance along the optical axis A from the surface of the lens of the optical lens 100 closest to the magnified side 110 (i.e., the surface S1 of the first lens L1) to the imaging surface 180 of the optical lens 100, and IMH is a diameter of the imaging plane.

In addition, the interval in Table 1 is the distance from the surface at the magnified side 110 to the next surface at the minified side 120. In other words, the thickness of the first lens L1 is 10.465 mm, the thickness of the second lens L2 is 6.101 mm, the distance between the adjacent surfaces of the first lens L1 and the second lens L2 is 2.931 mm, and the rest may be deduced therefrom and thus will not be further described hereinafter.

In addition, the curvature radius in Table 1 is the curvature radius of the corresponding surface, and its positive and negative values represent the bending direction. For instance, the curvature radius of the surface S1 of the first lens L1 is positive, and the curvature radius of the surface S2 of the first lens L1 is positive. Therefore, the first lens L1 is a convex-concave lens. In another example, the curvature radius of the surface S12 of the sixth lens L6 is positive, and the curvature radius of the surface S13 of the sixth lens L6 is negative. Therefore, the sixth lens L6 is a biconvex lens. The rest may be deduced from the above and thus will not be further explained hereinafter.

Table 2 below lists the quadric coefficient value K of each aspheric surface and each of the aspheric coefficients A-H. The aspheric polynomial may be expressed by the following equation (1):

$$x = \frac{c'y^2}{1+\sqrt{1-(1+K)c'^2y^2}} + Ay^2 + By^4 + Cy^6 + Dy^8 + Ey^{10} + Fy^{12} + Gy^{14} + Hy^{16} \qquad (1)$$

Here, x is the offset (sag) in the direction of the optical axis A, and c' is the reciprocal of the radius of the osculating sphere, i.e., the reciprocal of the radius of the curvature radius near the optical axis, k is the quadric coefficient, and y is the height of the aspheric surface, i.e., the height from the center of the lens to the edge of the lens. A-H respectively represent the aspheric coefficients of each order of the aspheric polynomial.

TABLE 2

|  | S3 | S4 | S5 | S6 |
|---|---|---|---|---|
| K | −1.924 | −0.988 | −4.477 | −6.852 |
| A | 0 | 0 | 0 | 0 |
| B | 9.14E−04 | 4.92E−02 | 6.20E−02 | 7.08E−02 |
| C | −7.76E−03 | 4.06E−02 | 4.89E−03 | −6.29E−03 |
| D | 2.47E−03 | −4.61E−02 | −4.27E−03 | −1.63E−01 |
| E | −3.72E−03 | 2.00E−02 | 5.05E−03 | 5.67E−01 |
| F | 2.84E−05 | 1.77E−03 | −1.72E−03 | −1.01E−02 |
| G | −8.25E−07 | 1.71E−03 | 5.58E−04 | −1.26E 00 |
| H | −1.14E−08 | −1.43E−03 | −3.01E−04 | 8.52E−01 |

|  | S10 | S11 | S12 | S13 |
|---|---|---|---|---|
| K | 1.14 | −1.693 | −1.693 | −6.985 |
| A | 0 | 0 | 0 | 0 |
| B | −3.74E−02 | 2.48E−02 | 2.48E−02 | −4.59E−02 |
| C | 2.49E−02 | 3.62E−02 | 3.62E−02 | 3.02E−02 |
| D | −8.76E−03 | −1.23E−02 | −1.23E−02 | −1.16E−02 |
| E | −7.24E−06 | −3.13E−05 | −3.13E−05 | 2.08E−03 |
| F | 8.48E−06 | 1.17E−05 | 1.17E−05 | 3.62E−05 |
| G | 1.35E−04 | 5.21E−05 | 5.21E−05 | −5.48E−05 |
| H | 1.50E−04 | 1.06E−04 | 1.06E−04 | 4.16E−06 |

Figure 3:
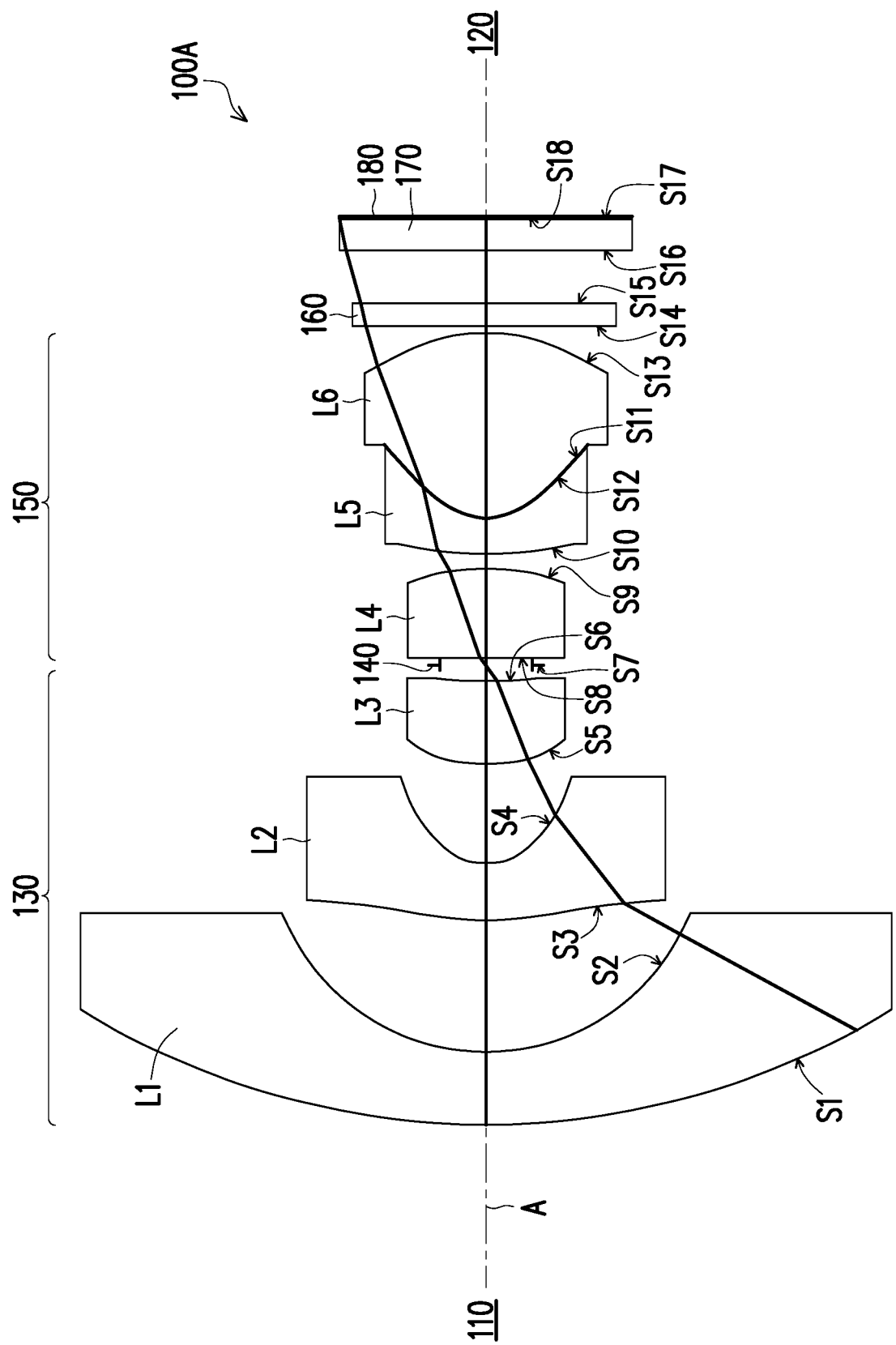
FIG. 3 is a schematic diagram of an optical lens according to another embodiment of the invention.

FIG. 3 is a schematic diagram of an optical lens according to another embodiment of the invention. With reference to FIG. 3, the optical lens 100A shown in the embodiment is similar to the optical lens 100 shown in FIG. 1. The difference between the two lies in that the surface S11 of the fifth lens L5 is spherical according to the embodiment.

In the embodiment, the actual design of the aforesaid elements may be found in the Table 3 below. The interpretation method of Table 3 is the same as that of Table 1 and thus will not be further explained hereinafter.

TABLE 3

EFL (mm) = 0.896; F/# = 2; FOV (°) = 218; TTL (mm) = 12.34;
IMH (mm) = 4.01; RL (mm) = 3.3; LT (mm) = 10.762;
RL/LT = 0.307; EFL/LT = 0.0833;

| Elements | Surface | Curvature radius (mm) | Interval (mm) | Refractive index (Nd) | Abbe number (Vd) |
|---|---|---|---|---|---|
| First lens L1 | S1 | 10.481 | 1 | 1.804 | 46.5 |
|  | S2 | 3.013 | 1.792 |  |  |
| Second lens L2 | S3 * | 5.007 | 0.761 | 1.536 | 56.0 |
|  | S4 * | 0.76 | 1.356 |  |  |
| Third lens L3 | S5 * | 2.35 | 1.145 | 1.640 | 23.5 |
|  | S6 * | 18.131 | 0.2 |  |  |
| Aperture 140 | S7 | Infinite | 0.1 |  |  |
| Fourth lens L4 | S8 | 20.332 | 1.216 | 1.804 | 46.5 |
|  | S9 | −3 | 0.202 |  |  |
| Fifth lens L5 | S10 * | 4.349 | 0.481 | 1.640 | 23.5 |
|  | S11 | 0.854 | 0.008 |  |  |

TABLE 3-continued

EFL (mm) = 0.896; F/# = 2; FOV (°) = 218; TTL (mm) = 12.34;
IMH (mm) = 4.01; RL (mm) = 3.3; LT (mm) = 10.762;
RL/LT = 0.307; EFL/LT = 0.0833;

| Elements | Surface | Curvature radius (mm) | Interval (mm) | Refractive index (Nd) | Abbe number (Vd) |
|---|---|---|---|---|---|
| Sixth lens L6 | S12 * | 0.854 | 2.511 | 1.536 | 56.0 |
|  | S13 * | −1.903 | 0.1 |  |  |
| Infrared filter 160 | S14 | Infinite | 0.3 | 1.517 | 64.2 |
|  | S15 | Infinite | 0.733 |  |  |
| Protective cover 170 | S16 | Infinite | 0.4 | 1.517 | 64.2 |
|  | S17 | Infinite | 0.045 |  |  |
| Imaging surface 180 | S18 | Infinite | 0 |  |  |

Table 4 below lists the quadric coefficient value K of each aspheric surface and each of the aspheric coefficients A-H.

TABLE 4

|   | S3 | S4 | S5 | S6 |
|---|---|---|---|---|
| K | −3.09E 00 | −9.40E−01 | −3.40E 00 | −4.98E 02 |
| A | 0 | 0 | 0 | 0 |
| B | 4.38E−04 | 5.81E−02 | 6.41E−02 | 5.39E−02 |
| C | −7.81E−03 | 3.95E−02 | 5.90E−03 | 3.56E−02 |
| D | 2.47E−03 | −4.25E−02 | 3.00E−03 | −1.57E−01 |
| E | −3.71E−04 | 2.11E−02 | 6.12E−03 | 4.58E−01 |
| F | 2.86E−05 | 1.57E−03 | −2.15E−03 | −1.20E−01 |
| G | −7.69E−07 | 2.96E−03 | 2.27E−03 | −9.99E−01 |
| H | −1.99E−08 | 1.41E−03 | −1.02E−03 | 9.58E−01 |

|   | S10 | S12 | S13 |
|---|---|---|---|
| K | 1.52E 00 | −1.53E 00 | −6.88E 00 |
| A | 0 | 0 | 0 |
| B | −3.65E−02 | 3.34E−02 | −4.64E−02 |
| C | 2.14E−02 | 3.49E−02 | 2.98E−02 |
| D | −1.23E−02 | −1.63E−02 | −1.18E−02 |
| E | −4.96E−04 | −3.63E−03 | 2.00E−03 |
| F | 4.97E−04 | −1.53E−03 | 2.71E−05 |
| G | 2.50E−04 | 1.78E−05 | −4.75E−05 |
| H | 2.64E−04 | 6.50E−04 | 1.13E−05 |

Figure 5:
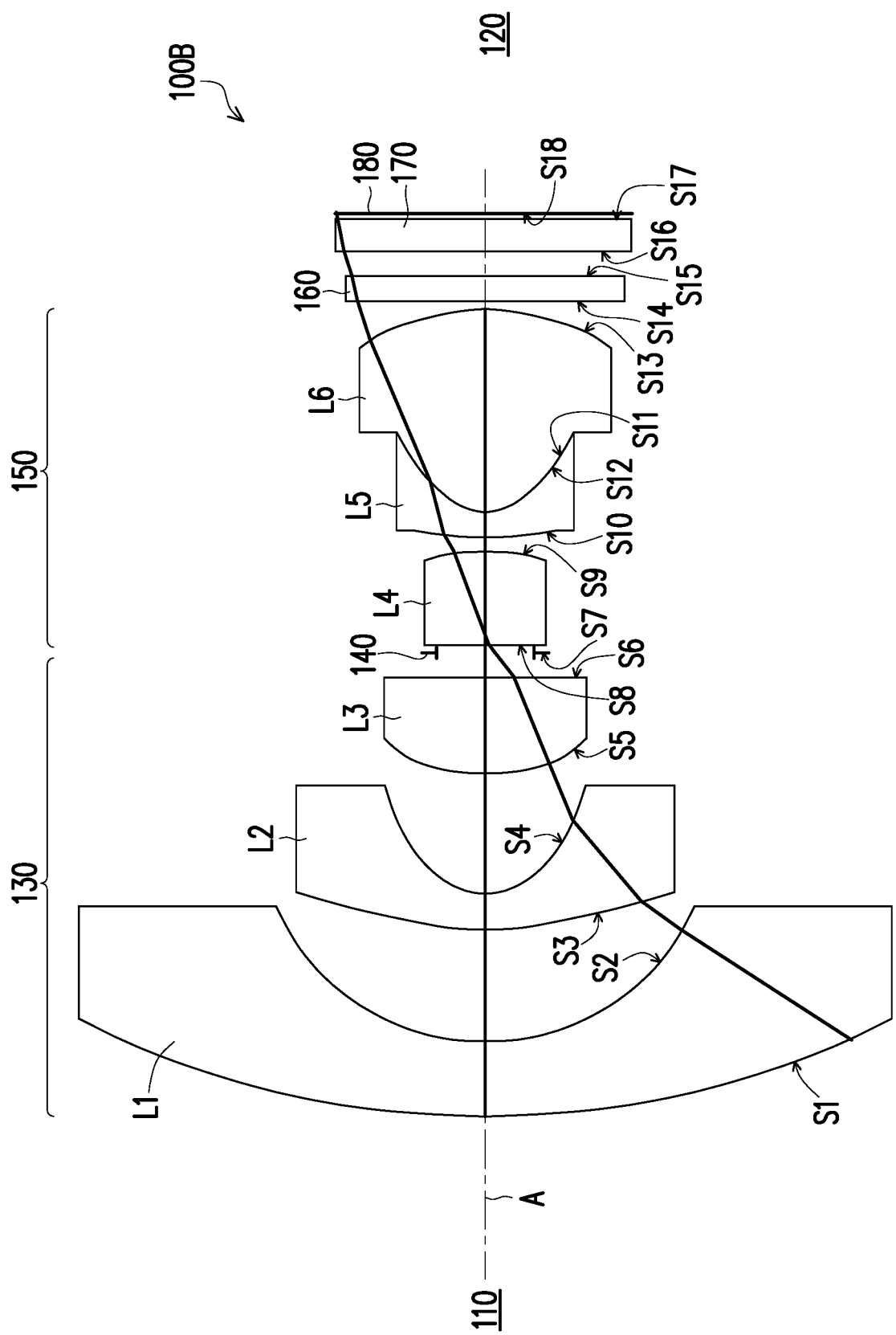
FIG. 5 is a schematic diagram of an optical lens according to another embodiment of the invention.

FIG. 5 is a schematic diagram of an optical lens according to another embodiment of the invention. With reference o FIG. 5, the optical lens 100B shown in the embodiment is similar to the optical lens 100 shown in FIG. 1. The difference between the two lies in that the surface S11 of the fifth lens L5 is spherical according to the embodiment.

In the embodiment, the actual design of the aforesaid elements may be found in Table 5 below. The interpretation method of Table 5 is the same as that of Table 1 and thus will not be further explained hereinafter.

TABLE 5

EFL (mm) = 0.9; F/# = 2; FOV (°) = 218; TTL (mm) = 12.3;
IMH (mm) = 4.01; RL (mm) = 3.435; LT (mm) = 11.007;
RL/LT = 0.312; EFL/LT = 0.0818;

| Elements | Surface | Curvature radius (mm) | Interval (mm) | Refractive index (Nd) | Abbe number (Vd) |
|---|---|---|---|---|---|
| First lens L1 | S1 | 12.319 | 1 | 1.804 | 46.5 |
|  | S2 | 3.105 | 1.543 |  |  |
| Second lens L2 | S3 * | 4.378 | 0.484 | 1.536 | 56.0 |
|  | S4 * | 0.872 | 1.651 |  |  |
| Third lens L3 | S5 * | 3.171 | 1.301 | 1.640 | 23.5 |
|  | S6 * | −41 | 0.358 |  |  |

TABLE 5-continued

EFL (mm) = 0.9; F/# = 2; FOV (°) = 218; TTL (mm) = 12.3;
IMH (mm) = 4.01; RL (mm) = 3.435; LT (mm) = 11.007;
RL/LT = 0.312; EFL/LT = 0.0818;

| Elements | Surface | Curvature radius (mm) | Interval (mm) | Refractive index (Nd) | Abbe number (Vd) |
|---|---|---|---|---|---|
| Aperture 140 | S7 | Infinite | 0.09 |  |  |
| Fourth lens L4 | S8 | 26.147 | 1.278 | 1.804 | 39.6 |
|  | S9 | −2.96 | 0.181 |  |  |
| Fifth lens L5 | S10 * | 3.357 | 0.364 | 1.640 | 23.5 |
|  | S11 | 0.678 | 0 |  |  |
| Sixth lens L6 | S12 * | 0.678 | 2.757 | 1.536 | 56.0 |
|  | S13 * | −2.164 | 0.11 |  |  |
| Infrared filter 160 | S14 | Infinite | 0.33 | 1.517 | 64.2 |
|  | S15 | Infinite | 0.364 |  |  |
| Protective cover 170 | S16 | Infinite | 0.44 | 1.517 | 64.2 |
|  | S17 | Infinite | 0.05 |  |  |
| Imaging surface 180 | S18 | Infinite | 0 |  |  |

Table 6 below lists the quadric coefficient value K of each aspheric surface and each of the aspheric coefficients A-H.

TABLE 6

|   | S3 | S4 | S5 | S6 |
|---|---|---|---|---|
| K | −1.07E 01 | −8.96E−01 | −4.39E 00 | 0 |
| A | 0 | 0 | 0 | 0 |
| B | 8.85E−03 | 2.26E−02 | 3.78E−02 | 3.55E−02 |
| C | −5.05E−03 | 2.51E−02 | 4.87E−03 | 2.06E−02 |
| D | 1.28E−03 | −1.10E−02 | 1.92E−03 | −5.22E−02 |
| E | −1.60E−04 | 3.66E−03 | 4.79E−04 | 1.54E−01 |
| F | 9.84E−06 | 4.51E−04 | −6.80E−04 | −2.24E−01 |
| G | −2.69E−07 | 1.29E−03 | 5.21E−04 | 1.26E−01 |
| H | 0 | 0 | 0 | 0 |

|   | S10 | S12 | S13 |
|---|---|---|---|
| K | 4.30E−02 | −1.25E 00 | −6.38E 00 |
| A | 0 | 0 | 0 |
| B | −3.40E−02 | 2.50E−02 | 1.75E−03 |
| C | 9.06E−03 | 5.51E−02 | 1.13E−03 |
| D | 1.52E−03 | −5.04E−05 | −2.17E−03 |
| E | 3.43E−03 | 2.86E−03 | 3.70E−04 |
| F | −1.16E−03 | 2.04E−04 | −3.77E−06 |
| G | −4.71E−03 | −5.22E−03 | −3.92E−05 |
| H | 0 | 0 | 0 |

Figure 2A:
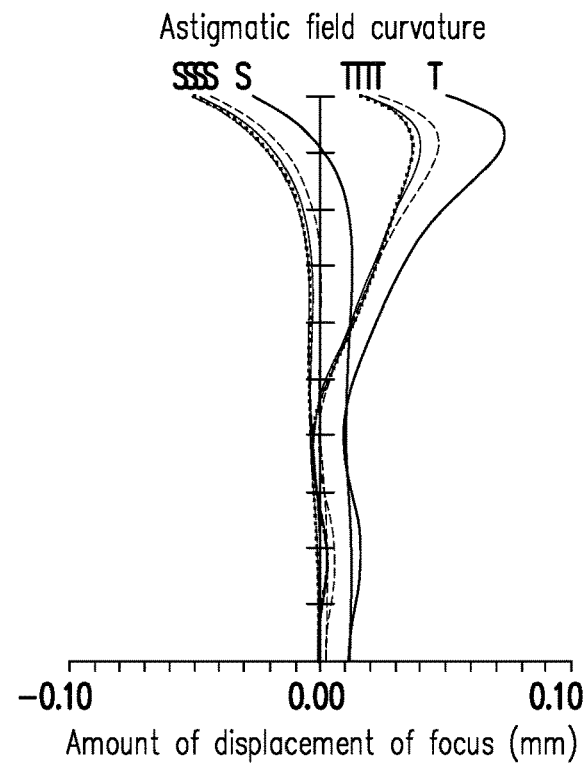
FIG. 2A and FIG. 2B are diagrams illustrating astigmatic field curvature and distortion of the optical lens provided in the embodiment shown in FIG. 1, respectively.
Figure 2B:
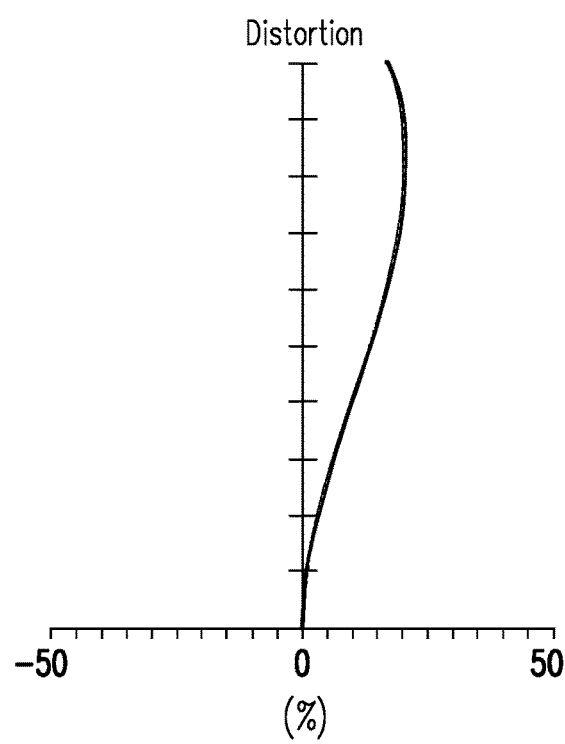
Figure 4A:
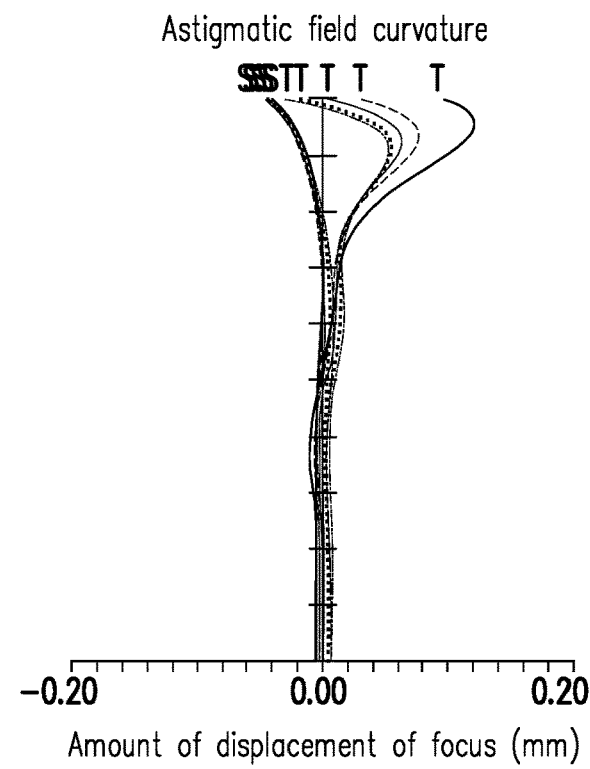
FIG. 4A and FIG. 4B are diagrams illustrating astigmatic field curvature and distortion of the optical lens provided in the embodiment shown in FIG. 3, respectively.
Figure 4B:
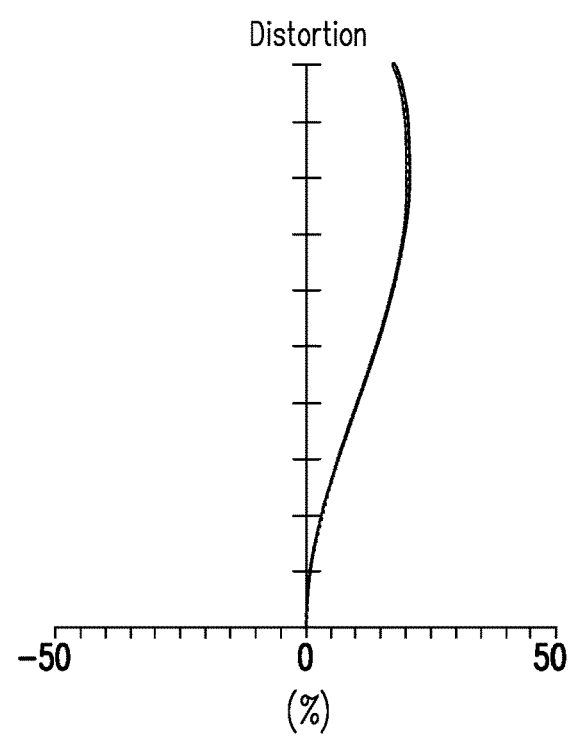
Figure 6A:
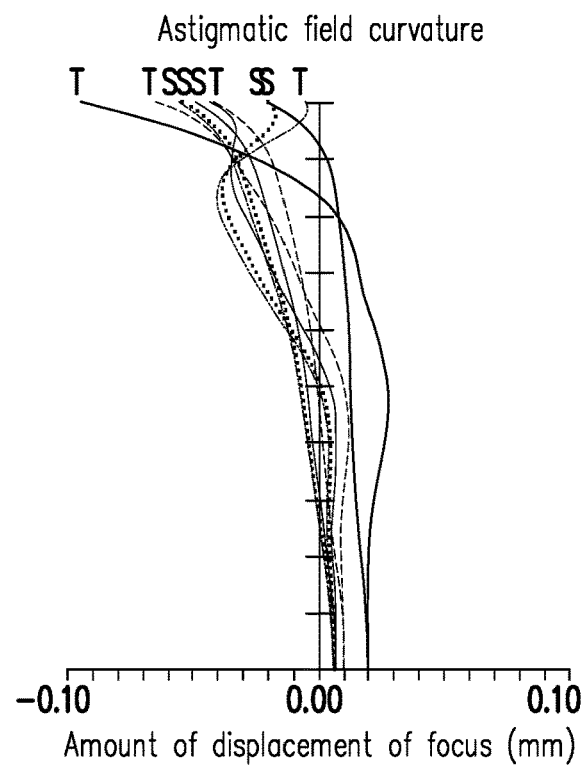
FIG. 6A and FIG. 6B are diagrams illustrating astigmatic field curvature and distortion of the optical lens provided in the embodiment shown in FIG. 5, respectively.
Figure 6B:
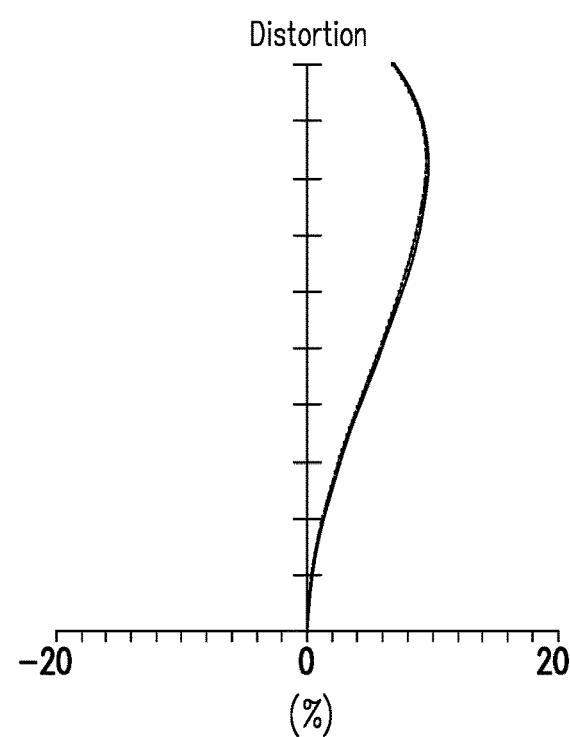

FIG. 2A and FIG. 2B, FIG. 4A and FIG. 4B, and FIG. 6A and FIG. 6B are diagrams illustrating astigmatic field curvature and distortion of the optical lenses 100, 100A, and 100B provided in the embodiments, respectively. FIG. 2A, 4A, and 6A illustrate the astigmatic field curvatures of respective optical lenses 100, 100A, and 100B, the horizontal axis is the amount of displacement of focus (mm), the vertical axis is the image height, T is the curve in a tangential direction, S is the curve in the sagittal direction, and different line segment styles represent the measurement situations at different wavelengths. FIG. 2B, 4B, and 6B illustrate the distortions of respective optical lenses 100, 100A, and 100B, the horizontal axis represents the distortion percentage (%), the vertical axis represents the image height, and different line segment styles represent the measurement situations at different wavelengths. It may thus be verified that the astigmatic field curvatures and distortions the optical lenses 100, 100A, and 100B provided in the embodiment are within a standard range while the wavelength is between 450 nm and 650 nm, whereby the optical lenses 100, 100A may have good optical imaging quality, as shown in FIG. 2A and FIG. 2B, FIG. 4A and FIG. 4B, and FIG. 6A and FIG. 6B.

To sum up, in the optical lens as provided in one or more embodiments of the invention, the aspherical lenses are configured to improve the resolution, and the negative refractive power lens is configured to achieve wide-angle light collection, whereby the number of lenses and costs may be effectively reduced, the aberration issue may be better resolved, and good optical effects may be achieved.

Although the invention has been disclosed as above by way of example, it is not intended to limit the invention. Any person with ordinary knowledge in the technical field to which he belongs can make minor changes and modifications without departing from the spirit and scope of the invention. The protection scope of the invention shall be determined by the scope of the attached patent application.

What is claimed is:

1. An optical lens, comprising:
   a first lens group, an aperture, and a second lens group arranged sequentially from a magnified side to a minified side along an optical axis,
   wherein the first lens group has a negative refractive power, the first lens group comprises a first lens, a second lens, and a third lens with refractive powers sequentially arranged along the optical axis from the magnified side to the minified side, the first lens group comprises a lens with a positive refractive power, and the first lens group comprises an aspheric lens;
   wherein the second lens group has a positive refractive power, the second lens group comprises a fourth lens, a fifth lens, and a sixth lens with refractive powers sequentially arranged along the optical axis from the magnified side to the minified side, the second lens group comprises a lens with a negative refractive power, a lens of the second lens group closest to the minified side is a cemented lens, and the second lens group comprises an aspheric lens;
   wherein a number of the lenses having the refractive powers in the optical lens is within a range from 6 to 8 lenses, and the optical lens satisfies following conditions:
   (1) 9<LT/EFL<15, wherein LT is a distance along the optical axis from a surface of a lens of the first lens group closest to the magnified side to a surface of a lens of the second lens group farthest from the first lens group, and EFL is an effective focal length of the optical lens; and
   (2) LT/D1<12, wherein D1 is a thickness of the lens of the first lens group closest to the magnified side along the optical axis,
   wherein the optical lens satisfies 4<Z1/Z2<10, wherein Z1 is a larger one of a fifth lens thickness and a sixth lens thickness, Z2 is a smaller one of the fifth lens thickness and the sixth lens thickness, and the fifth lens thickness and the sixth lens thickness are respectively a thickness of the fifth lens and a thickness of the sixth lens along the optical axis, wherein the optical lens satisfies FOV>210, wherein FOV is the field of view of the optical lens.

2. The optical lens according to claim 1, wherein the thickness of the lens closest to the magnified side along the optical axis is greater than or equal to 1 mm.

3. The optical lens according to claim 1, wherein a refractive power of one of the cemented lens is positive, and a refractive power of the other is negative.

4. The optical lens according to claim 1, wherein the fifth lens and the sixth lens are aspheric lenses.

5. The optical lens according to claim 1, wherein refractive powers of the first lens to the fourth lens are sequentially negative, negative, positive, and positive.

6. The optical lens according to claim 1, wherein a refractive power of one of the fifth lens and the sixth lens is positive, and the other is negative.

7. The optical lens according to claim 1, wherein materials of the first lens and the fourth lens are glass, and materials of the second lens, the third lens, the fifth lens, and the sixth lens are plastic.

8. An optical lens, comprising:
   a first lens, a second lens, a third lens, an aperture, a fourth lens, a fifth lens, and a sixth lens sequentially arranged from a magnified side to a minified side along an optical axis, wherein the fifth lens and the sixth lens are cemented lenses, and the optical lens satisfies following conditions:
   (1) 9<LT/EFL<15, wherein LT is a distance along the optical axis from a surface of a lens of the first lens group closest to the magnified side to a surface of a lens of the second lens group farthest from the first lens group, and EFL is an effective focal length of the optical lens;
   (2) 4<D6/D5<10, wherein D5 is a thickness of the fifth lens along the optical axis, and D6 is a thickness of the sixth lens along the optical axis;
   (3) 180<FOV<230, wherein FOV is a field of view of the optical lens;
   (4) 80>A2>50, wherein A2 is an angle between an extension line of a concave edge of the second lens and a line perpendicular to the optical axis; and
   (5) a total number of lenses having refractive powers in the optical lens is six, wherein refractive powers of the first lens to the fourth lens are sequentially negative, negative, positive, and positive.

9. The optical lens according to claim 8, wherein the optical lens satisfies 210<FOV<230, wherein FOV is the field of view of the optical lens.

10. The optical lens according to claim 8, wherein the thickness of the lens closest to the magnified side along the optical axis is greater than or equal to 1 mm.

11. The optical lens according to claim 8, wherein a refractive power of one of the fifth lens and the sixth lens is positive, and the other is negative.

12. The optical lens according to claim 8, wherein materials of the first lens and the fourth lens are glass, and materials of the second lens, the third lens, the fifth lens, and the sixth lens are plastic.

13. The optical lens according to claim 8, wherein the optical lens satisfies 0.7<R1/LT<2, wherein R1 is an effective radius of the lens of the optical lens closest to the magnified side.

14. The optical lens according to claim 8, wherein the optical lens satisfies 0.2<RL/LT<0.38, wherein RL is an effective radius of the lens of the optical lens closest to the minified side.

* * * * *